(12) United States Patent
Cockayne et al.

(10) Patent No.: US 6,276,608 B1
(45) Date of Patent: Aug. 21, 2001

(54) DATA STORAGE AND COMMUNICATION SYSTEM

(75) Inventors: William Roy Cockayne, Menlo Park, CA (US); Zachary J. Pessin, St. Louis, MO (US); Nathan Gaston Schmidt, Longmont, CO (US); Jennifer Sun-Min Cha, San Francisco, CA (US)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/222,741

(22) Filed: Dec. 29, 1998

(51) Int. Cl.[7] .......................... G06K 19/06; G06K 13/24
(52) U.S. Cl. ........................................... 235/492; 235/485
(58) Field of Search .................................. 235/375, 439, 235/486, 487, 485, 441, 492

(56) References Cited

U.S. PATENT DOCUMENTS

| | | | |
|---|---|---|---|
| 5,300,938 | * | 4/1994 | Maroun et al. .................... 343/702 |
| 5,529,503 | * | 6/1996 | Kekrlaan ............................ 235/492 |
| 5,664,228 | * | 9/1997 | Mital ................................. 235/380 |
| 6,036,101 | * | 3/2000 | Hass et al. ......................... 235/441 |

FOREIGN PATENT DOCUMENTS

0917086A2 * 5/1999 (EP) .

* cited by examiner

Primary Examiner—Karl D. Frech
Assistant Examiner—Larry D. Taylor
(74) Attorney, Agent, or Firm—Crowell & Moring, L.L.P.

(57) ABSTRACT

A portable data storage and communication system includes a disk-shaped device having at least one universal contact symmetrically arranged about a center of the disk-shaped device. The disk-shaped device has at least one electrical component arranged therein which is coupled with the universal contact. An interface device receives the disk-shaped device and has at least one defined interface contact. The interface contact operatively couples with the universal contact regardless of the orientation of the disk-shaped device in the interface device.

10 Claims, 6 Drawing Sheets

DATA STORAGE AND COMMUNICATION SYSTEM

FIELD OF THE INVENTION

The invention relates to a data storage and communication system and, more particularly, to a portable data storage device which electrically couples with a communications system for communicating and receiving data or other information.

BACKGROUND OF THE INVENTION

At present, it is known to provide portable memory storage devices which can be carried by an individual user and used in conjunction with one or more memory reading devices in order to communicate information therebetween. Such portable memory storage devices are often termed "smart cards" which are used to operate various electronic devices such as electronic locks, telephones, etc.

In general, these known smart cards are composed of a plastic material in which is embedded a data storage capability, such as an integrated circuit memory chip or the like. In use, the individual must properly orient the smart card for insertion into a particular reading device in order to establish the appropriate electrical contacts. Because only one orientation correctly operates the smart card in any particular card reading device, the user oftentimes incorrectly loads the card such that the particular device will not operate. This, of course, is not user friendly and results in the user becoming frustrated with the smart card. Further, because many different smart card/card reading systems exist, each of which may require a slightly different orientation between the smart card and the card reader for proper operation, the individual user must constantly determine the proper orientation prior to using each smart card.

In general, the known smart cards have a rectangular shape approximately the size of a standard credit card. Due to this particular form factor of the smart cards, it becomes quite cumbersome and inconvenient to carry the cards. Also, because of the relatively large size of the known smart cards, they are easily damaged due to bending or twisting, especially when carried in a user's pant's pocket, for example. Alternatively, another type of smart card is the so-called "memory stick" which is essentially a portable, re-recordable storage media that can save digital photos, data, music or other information for example. These sticks generally measure around 1.5 inches long and have a thickness comparable to a piece of gum. The memory contained in the stick is, for example, flash memory which couples with a special controller and serial interface for communicating with different types of consumer electronic devices such as digital cameras. However, even the smaller sized memory stick suffers the same problem of a smart card in that it has to be used in a particular orientation which the user must recognize.

Currently known portable data storage systems, such as the smart card systems mentioned above, have as a primary goal the storage of a large amount of data. Because the size of the data storage directly correlates to the cost of the system, the known portable data storage systems are relatively expensive, costing on the order of tens of dollars per device.

There is therefore needed a data storage and communication system which overcomes the problems and disadvantages associated with the known card or stick systems.

According to the present invention, these needs are met by providing a portable data storage device having a generally circular disk shape in which data can be stored through the use of a small memory chip, for example. The disk-shaped portable data storage device is provided with a number of universal contacts which eliminate the need for the data storage device to have any one particular orientation for its activation.

The present invention also provides an interface device for electrically coupling with the disk-shaped storage device. The interface device is configured to operatively couple with the disk-shaped data storage device regardless of its particular orientation. The interface device is primarily composed of two parts including a latching mechanism and specific interface components. The interface components, for example, an electrical interface, includes defined contact areas which universally match with those on the disk-shaped storage device so as to provide electrical power, a ground reference, and a communication signal path to the disk-shaped storage device. The latching mechanism of the interface device provides the physical interface for receiving the disk-shaped storage device. The physical interface is configured in accordance with the size and shape of the disk-shaped storage device. In one preferred embodiment according to the invention, a generally C-shaped holder is provided which allows for the disk-shaped data storage device to be inserted therein by elastically expanding the free ends of the holder. Alternative preferred embodiments include pivot and spring latching mechanisms using latching arms with various configurations. By varying the configuration of the latching arm as well as the location and type of the springs and pivots, different "grabbing" and "releasing" sensations are provided for the disk-shaped storage device.

In a preferred embodiment, the interface device is provided with a tuner and antenna system so as to communicate via a wireless radio frequency connection with external systems which can then obtain data from the portable data storage device. In this manner, information stored in the disk-shaped portable data storage device can be used by the tuner to select a particular frequency to be monitored. The interface device can thus discriminate the frequency spectrum in order to detect the monitored frequency for communication with the disk-shaped data storage device.

In a preferred embodiment, the disk-shaped data storage device is a "smart coin" having a coin-like shape, for example, the shape of a casino chip, a U.S. quarter, or the like and is provided with predefined contact points. In particular, each planar surface of the coin-shaped storage device can have a central contact arranged at its center. In this manner, the location or orientation of the center contact can always be determined when the coin-shaped storage device is inserted into a reading device. Further, at least one ring contact is provided on each surface of the "smart coin". The ring contacts are concentric about the center of the smart coin. By arranging these ring contacts concentrically about the center of the smart coin, a universal contact area is provided for use by the smart coin reader. Advantageously, the concentric ring contacts exist on both sides of the smart coin. This provides a consistent contact surface on both sides of the smart coin such that its particular rotational and top-bottom orientation becomes irrelevant.

The use of the above-defined four contact areas allow for the coupling of the power, ground and a signal with the smart coin. In particular, the center contact provided on both sides of the smart coin receives the power on one side and the ground on the other. In an especially preferred embodiment, the coin reader interface device is responsible for ascertaining the particular orientation of the smart coin inserted therein so as to switch the direction of the power flow for proper operation. Both of the ring contacts, i.e., one on each side, are usable with the communication signal. Again, the use of dual-sided ring signal contacts advantageously allows the coin reader to function with only a single signal contact itself, regardless of the orientation of the coin within the reader.

In a further preferred embodiment, the smart coins are provided with only a minimal amount of memory, for example, less than one megabyte, such that they can be manufactured and sold at low cost. The use of a smart coin allows a user to carry several coins easily and comfortably within a purse, handbag or pant's pocket. Furthermore, the coin shape is less susceptible to damage. It also advantageously is already accepted by the population at large due to their familiarity with the use of monetary coins.

In a further preferred embodiment, the interface device or so-called "coin reader" includes a microprocessor and its associated components and peripherals. The microprocessor is coupled to interface contacts within the coin reader. These contacts are located so as to correspond to the center contacts of the smart coin as well as the ring signal contacts. The microprocessor is also coupled with a power source which powers the microprocessor as well as the memory chip within the smart coin.

In an especially preferred embodiment, the coin reader is provided with a display device for providing display information to the user. Alternatively, the display device can be provided on the smart coin itself. Also, the microprocessor can couple with a radio frequency tuner and antenna to allow for wireless reception of radio frequency signals.

It is an advantage of the present invention that in one embodiment the physical structure of the coin reader includes a generally C-shaped latching mechanism holder which can be made out of plastic, for example. The smart coin is then inserted and removed from the C-shaped holder by grasping that portion of the smart coin which remains exposed when in the holder. The use of the C-shaped holder provides a unique tactile sensation due to the resulting elastic expansion/contraction of the free ends of the holder when the smart coin is inserted and removed so as to inform the user when the coin is properly inserted.

In alternative embodiments, the latching mechanism makes use of a pivoting latching arm in conjunction with a spring. At least one of the latching arms can have a convex shape facing the smart coin. The arm is pivoted at an end away from the insertion point of the smart coin. The spring is coupled to the arm at a location away from the pivot so as to bias the arm in order to provide some resistance against the insertion of the smart coin. The use of a convexly shaped latching arm provides a smoother grabbing and releasing mechanism for the smart coin.

Of course, the unique features of the smart coin are not limited to only memory storage types of devices. The smart coin form factor can be used with a coin including a microprocessor so as to become in effect a portable computer. Alternatively, the smart coin can be used to store applications software of use with a microprocessor.

Other objects, advantages and novel features of the present invention will become apparent from the following detailed description of the invention when considered in conjunction with the accompanying drawings.

DETAILED DESCRIPTION OF THE DRAWINGS

Figure 1:
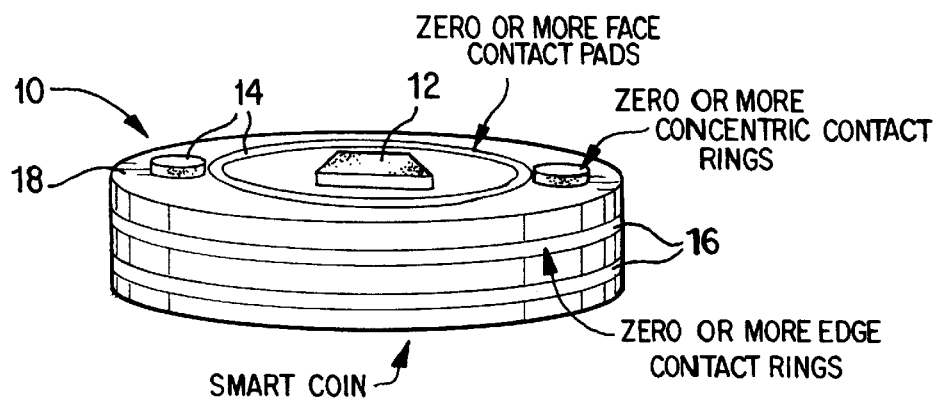
FIG. 1 is a perspective view of a disk-shaped portable data storage device according to the present invention.

Referring to FIG. 1, a disk-shaped portable data storage device 10 includes a center contact 12 arranged on both sides of the storage device 10 (only one side of which is shown). At least one ring contact 14 is arranged concentrically about the center point of the disk-shaped data storage device. In this embodiment, two edge contact rings 16 also extend about the edge periphery of the disk-shaped storage device 10. Contact pads 18 can also be formed on one or both surfaces of the disk-shaped storage device 10.

The disk-shaped data storage device 10 shown in FIG. 1 has a round, coin-shape which, in preferred embodiments, is comparable in size to a casino chip or a U.S. quarter. For example, the disk-shaped storage device, which will be referred to hereinafter as a "smart coin", can have an approximate one inch diameter and a $\frac{1}{16}$ to $\frac{1}{8}$ inch thickness. Further, one of the concentric contact rings 14 is arranged approximately one quarter inch from the smart coin edge and has a thickness (from its inner to outer circumference) of a quarter inch.

The contacts 12, 14, 16 and 18 all function to provide an electrical interface to the circuitry contained within the smart coin as well as a data reading device for the smart coin. Of course, one of skill in the art would readily understand that any number of contacts can be used on the smart coin in accordance with a corresponding interface device. Also, alternative dimensions can be used. The particular central contacts and contact rings shown in FIG. 1 are for illustrative purposes only.

The concentric contact rings 14 can, in a preferred embodiment, extend through the thickness of the smart coin so as to be electrically coupled to corresponding contact rings on an opposite surface thereof. Alternatively, each corresponding contact ring on opposite surfaces of the coin can have signal wires coupled directly to a common location for coupling to the memory or other smart circuitry. This provides a single contact ring which can be contacted on either side of the smart coin, regardless of the smart coin's orientation.

Figure 2:
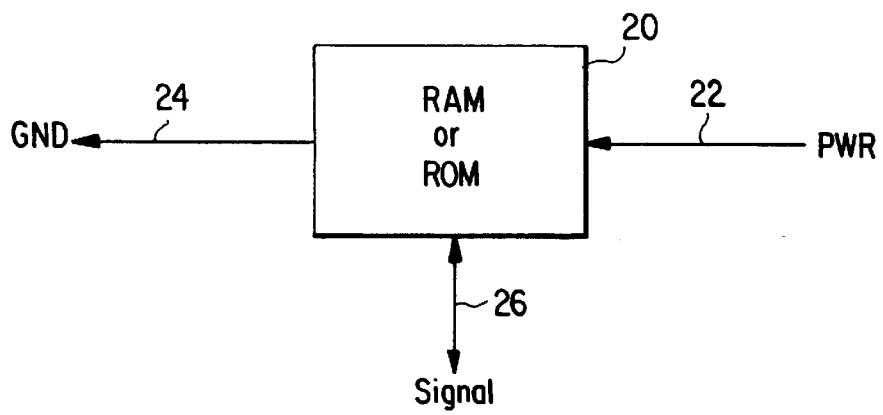
FIG. 2 is a schematic block diagram of the circuitry contained in the disk-shaped portable data storage device according to the present invention.

The circuitry arranged in the smart coin 10 is shown in FIG. 2. A data storage device 20, such as a RAM or ROM memory chip, couples with a power source 22, a ground reference 24, and a communications signal path 26 through respective ones of the center and ring contacts discussed above with respect to FIG. 1. In order to provide a low cost smart coin, the memory 20 typically has a size of less than one megabyte. However, any appropriately sized memory chip can be used in conjunction with the present invention.

Figure 3A:
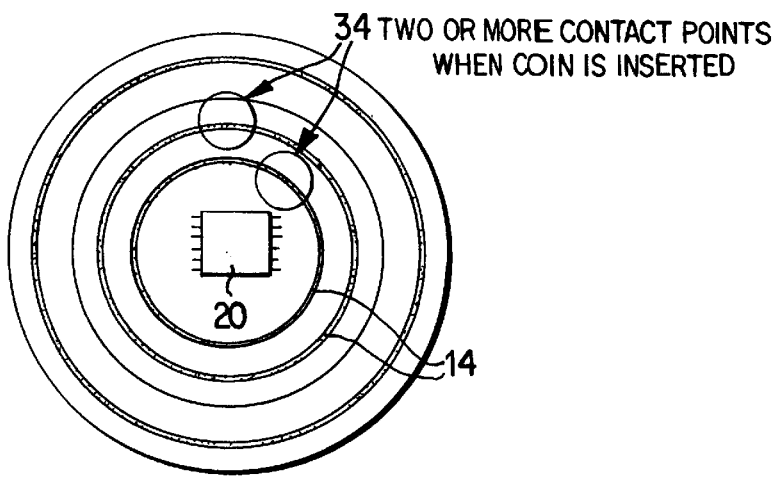
FIG. 3a is an illustrative diagram of the disk-shaped portable data storage device when inserted into the reading device.
Figure 3:
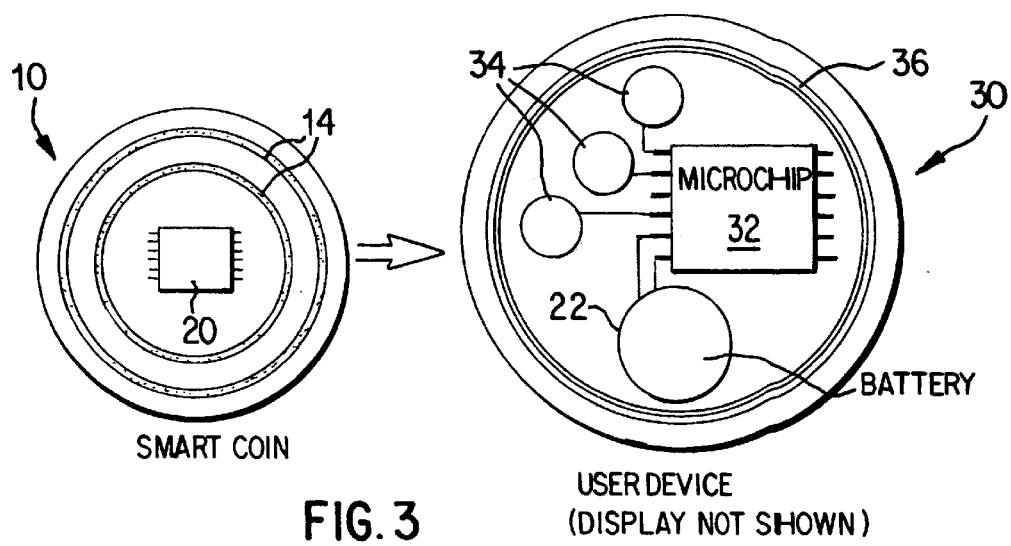
FIG. 3 is an illustrative diagram of the circuitry of the reading device in conjunction with the disk-shaped portable data storage device prior to insertion of the data storage device.

A data storage reading device 30 is graphically illustrated in FIG. 3 prior to its receiving the smart coin 10. The reading device 30 includes a microchip 32, such as a microprocessor, which is coupled to a power source 22 such as a battery. Contact points 34 also form inputs to the microprocessor 32. An antenna 36 is shown coupled to the microprocessor 32 as well.

Advantageously, the contact points 34 in the data storage reading device 30 are arranged to electrically contact the concentric contact rings 14 of the smart coin 10 when the smart coin is inserted into the reading device. Because the contacts 14 of the smart coin 10 are in the form of continuous rings, the contact points 34 of the reading device 30 will automatically align with the rings 14 when the smart coin 10 is inserted into the reading device. The reading device 30 also includes a center contact point (not shown) arranged so as to be generally coaxial with the center contacts 12 of the smart coin 10. Accordingly, this contact will also automatically align with the center contacts 12 of the smart coin when the smart coin is inserted into the reading device.

FIG. 3a graphically illustrates the electrical interface between the contact points 34 of the reading device and the concentric contact rings 14 of the smart coin 10. Of course, once again it will be understood by those of skill in the art that any number of contact points can be provided in the reading device in order to electrically interface with contacts of the smart coin. For example, the reading device could include edge contact points (not shown) which engage the edge contact rings 16 about the periphery of the smart coin 10. Hereto, the edge contact points will automatically contact the edge contact rings regardless of the angular orientation of the smart coin within the reading device.

Figure 4A:
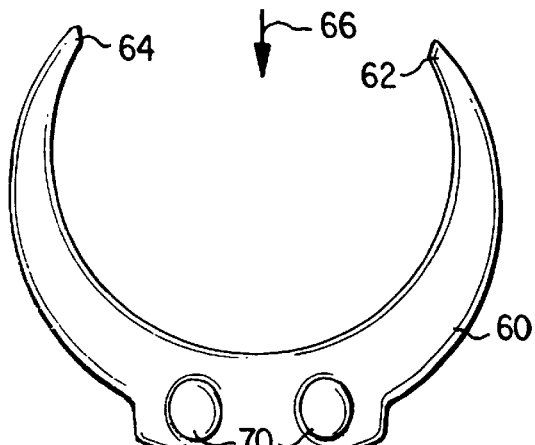
FIGS. 4a–4e are top views of one embodiment of the reading device and physical latching mechanism for holding the diskshaped portable data storage device when inserted into the reading device, FIG. 4a showing the C-shaped clamping device alone, FIG. 4b showing the clamping device with a portable storage device, FIG. 4c showing a reader housing which is cutaway to reveal the clamping device, FIG. 4d showing the top of the reader housing having a display, and FIG. 4e showing the reader housing with a portable storage device inserted therein.
Figure 4B:
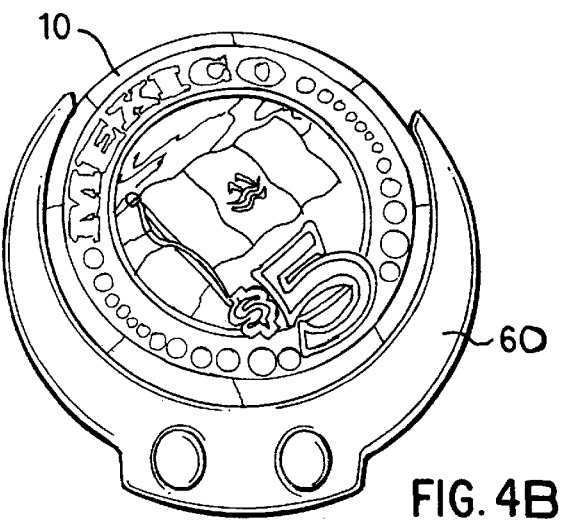

FIGS. 4a–4e illustrate one preferred embodiment of the physical structure of the reading device. In FIG. 4a, only a C-shaped clamping mechanism 60 is shown. The clamping mechanism 60 includes two free ends 62, 64 which can elastically expand and contract when a smart coin is inserted therein in the direction of arrow 66. FIG. 4b illustrates the positioning of a smart coin 10 within the clamping mechanism 60.

Figure 4C:
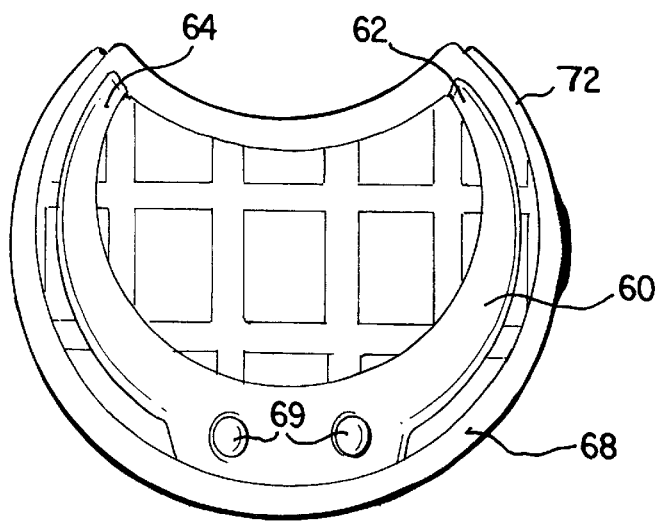
Figure 4D:
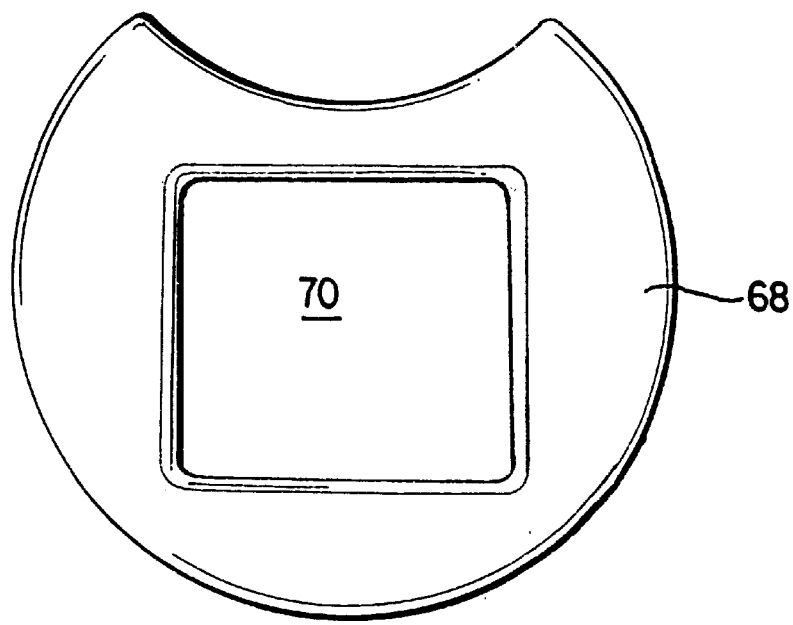
Figure 4E:
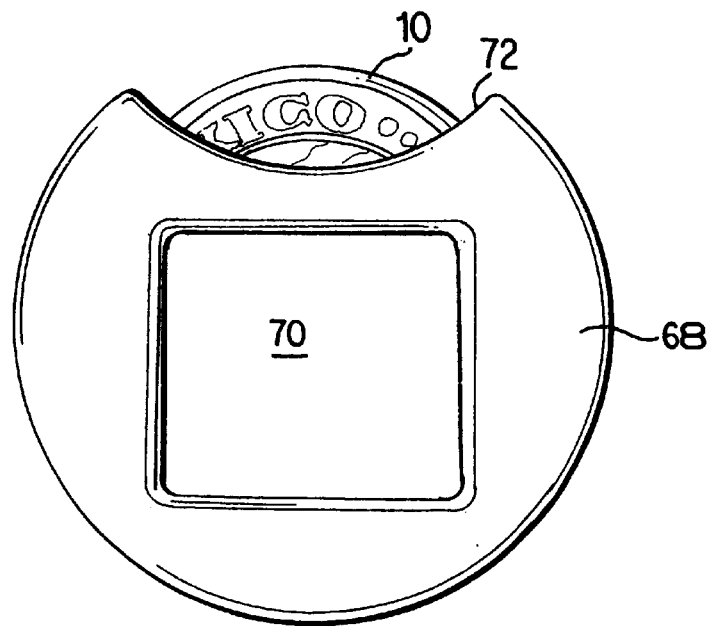

Referring to FIG. 4c, the C-shaped clamping mechanism 60 is shown arranged within a housing 68, the bottom portion of which is only shown. The housing 68 can include projections 69 which engage into openings 70 formed at the base of the C-shaped clamping mechanism 60. The side walls 72 of the housing are configured so as to leave room for the free ends 62, 64 of the C-shaped clamp to expand and contract upon the insertion and removal of the smart coin 10. The top portion of the housing 68 is shown in FIG. 4d. Built into the housing 68 can be, for example, a display 70 which provides the user with information relative to the operation of the smart coin 10. When a smart coin 10 is inserted into the reading device 68, as shown in FIG. 4e, a portion thereof remains exposed due to the notch 72 formed in the housing 68 of the reading device. This advantageously allows the user to easily grab the smart coin 10 for its insertion and removal.

While FIGS. 4a–4e describe a preferred embodiment of the physical structure for receiving the smart coin, any number of alternative latching mechanisms and reading device housings can be used. In preferred embodiments, the user will receive some type of feedback acknowledging that the smart coin is properly inserted in the reading device.

Figure 7:
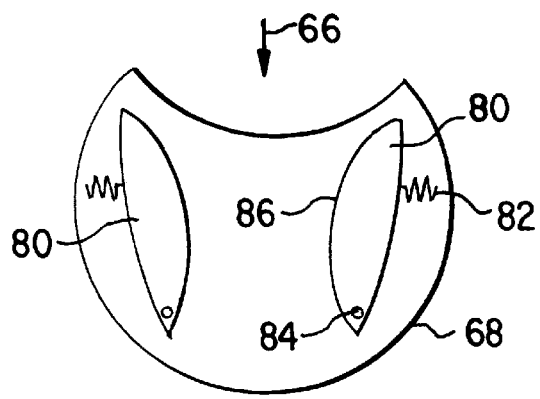
FIG. 7 illustrates another embodiment of the physical latching mechanism using spring biased, convexly shaped pivoting latching arms.
Figure 8A:
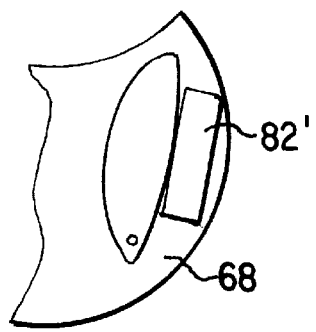
FIGS. 8a and 8b illustrate alternative spring biasing mechanisms for the latching arm, including a foam/polymer spring material and a sprung steel spring, respectively.
Figure 8B:
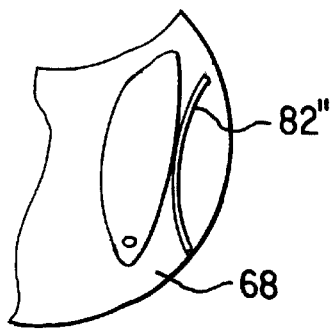

For example, FIG. 7 shows one alternative preferred latching mechanism. This latching mechanism is based on a pivot and spring system having at least one latching arm 80. The latching arm 80 is pivoted about pivot point 84 and is biased inwardly of the housing 68 via the spring 82, such as a helical spring. The smart coin is inserted in the direction of arrow 66 into the housing 68. In contrast to the C-shaped clamping mechanism 60 described with respect to FIG. 4, the use of the convexly shaped latching arm 80 provides a more or less continuous tactile sensation to the user. This is because the smart coin does not discretely snap into place as with the Cshaped clamping mechanism, but rather slides along the convex surface 86 of the latching arm 80 into position. By varying the curvature of the convex surface 86, the "feel" of the latching mechanism can be varied. Alternatively, the location of the spring 82 and pivot point 84 can be varied to provide different types of feel as well. As shown in FIGS. 8a and 8b, the spring 82 can be formed using a foam/polymer spring material 82' or a sprung steel spring 82", for example.

Figure 9:
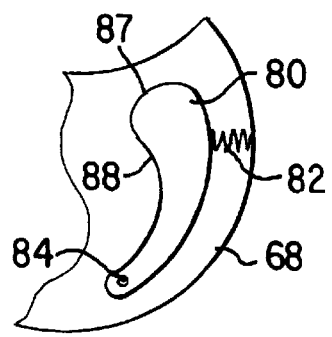
FIG. 9 illustrates another embodiment of the physical latching mechanism making use of a convex/concave shaped springbiased pivoting latching arm.

Another variation of the biased spring arm system latching mechanism is shown in FIG. 9. Here, the latching arm 80 is provided with both a convexly shaped surface 87 and a concavely shaped surface 88 facing the smart coin when inserted. A spring 82 is used to bias the latching arm 80 in the same manner as disclosed above. While the embodiment of FIG. 9 provides a more discrete grab/release point for the smart coin (at the transition between the convex surface 87 and the concave surface 88) this design advantageously provides the enhanced tactile features of the convexly shaped latching mechanisms as well as the secure positioning of the smart coin nested within the concave surface 88 as in the C-shaped clamping mechanism. Thus, the smart coin is seated very well within the housing 68. This design also advantageously allows the spring 82 to be substantially or fully unloaded once the smart coin is seated within the housing 68.

Figure 5:
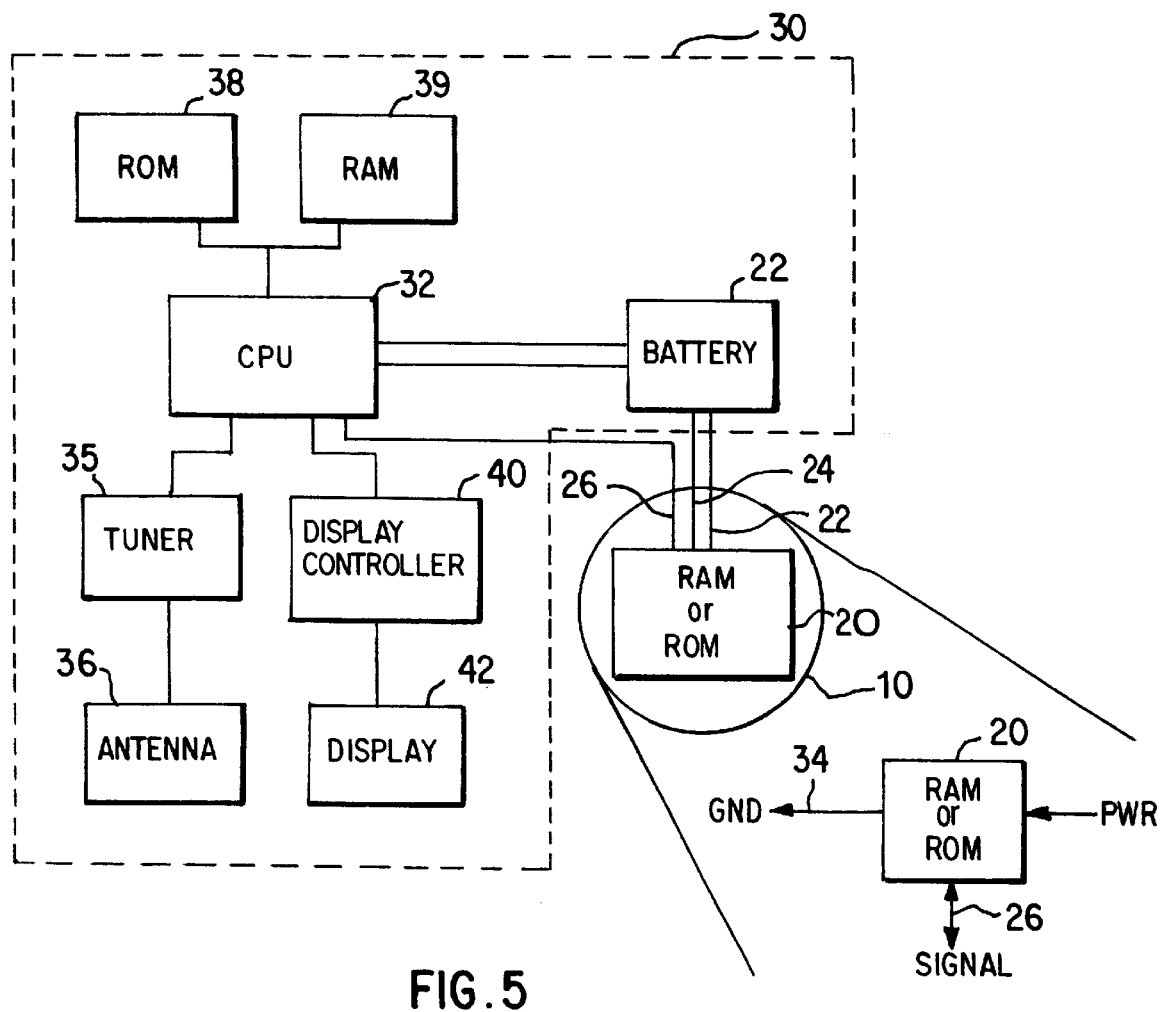
FIG. 5 is a schematic block diagram of the circuitry within the reading device coupled with the circuitry of the diskshaped portable data storage device when inserted therein.

FIG. 5 illustrates a schematic block diagram of the circuitry of the reading device 30 coupled with an inserted smart coin 10. The reading device 30 includes a microprocessor 32 having associated RAM and ROM memory 38, 39. The microprocessor 32 is coupled to a power source such as the battery 22. Further, the microprocessor 32 is coupled to a tuner circuit 35 which couples with the antenna 36. A display 42 is connected to a display driver or controller 40 which couples with the microprocessor 32. As shown in FIG. 4, the memory chip 20 of an inserted smart card 10 is electrically coupled to the power source 22 over power and ground lines 22, 24. Further, the memory chip is electrically coupled to the microprocessor 32 over communication signal path 26.

Advantageously, the center contacts 12 arranged on each side of the smart coin 10 function as the power source contact on one side of the smart coin and the ground contact on the other. When the smart coin 10 is inserted into the data storage reading device 30, the microprocessor 32 detects the orientation of the smart coin 10 and configures its operation to control the power flow through the smart coin 10 in the proper direction. Hence, the user can simply insert the smart coin into the reading device 30 without regard to which side is oriented in which direction. Similarly, the communications signal line 36, via one of the contacts 34, will automatically interface with a concentric ring contact 14 on the smart coin 10. Again, because the ring contacts 14 can be either individually coupled to the memory, or form a single contact which is coupled to the memory 20, only one contact point is necessary within the reader regardless of the orientation of the smart coin therein.

Figure 6:
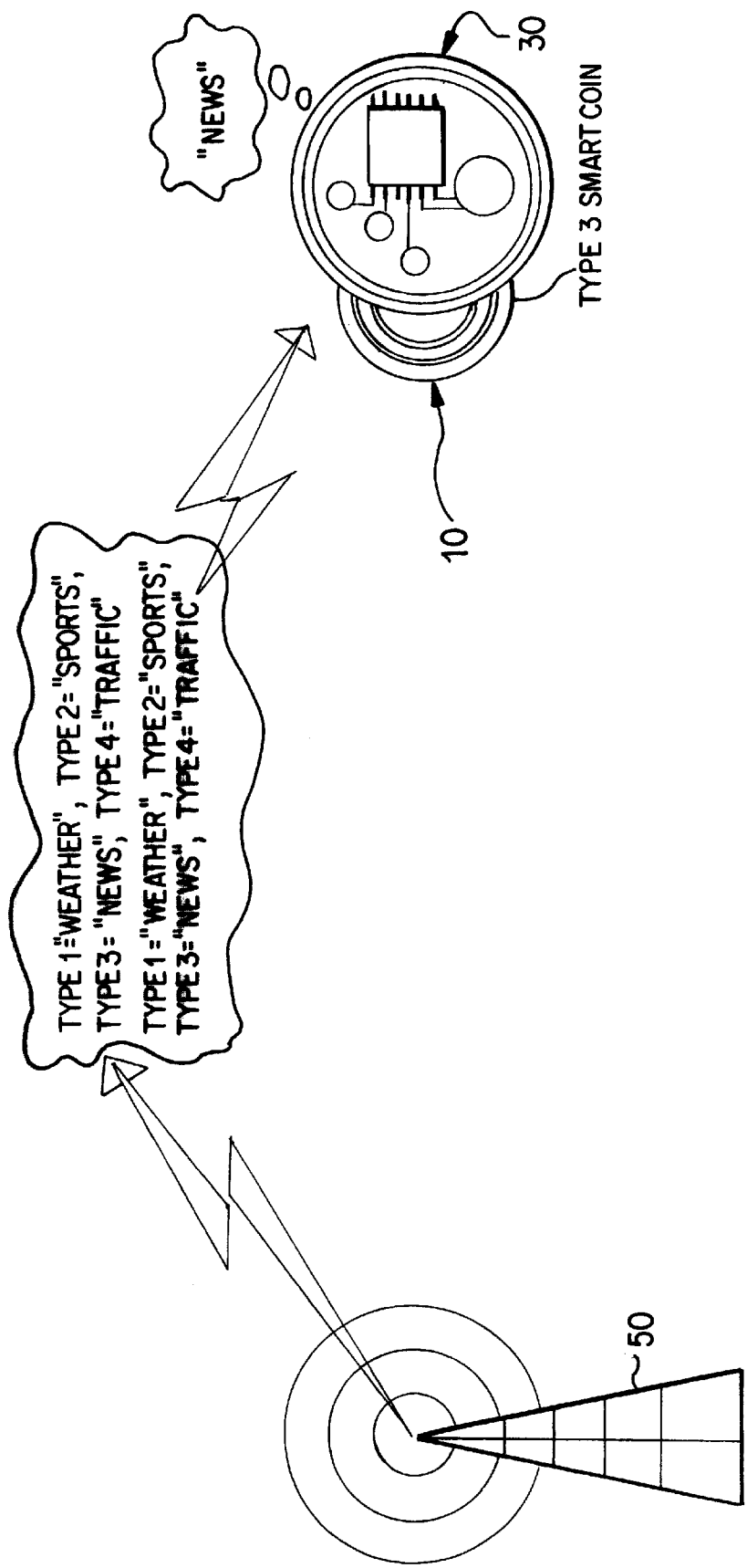
FIG. 6 is a diagram illustrating the tuning of the reading device in accordance with data stored in the portable disk-shaped storage device according to the present invention.

In one particular advantageous use of the smart coin 10 according to the present invention, radio frequency (RF) tuning information is stored within the memory 20. As shown in FIG. 6, this RF tuning information can be read by the microprocessor 32 in the data storage reading device 30 in order to operate a tuner 35 to select a particular frequency. For example, the reading device 30 can determine that the smart coin 10 is a "type 3 smart coin", in which case the reading device is tuned to the type 3 frequency from a radio source 50. In this example, the reading device 30 watches for the type 3 frequency which provides the "news" information.

The radio frequency tuning capability provided by the smart coin allows the smart coin to be used in many computer or consumer electronic devices in order to receive data over a pervasive and cost-effective RF connection.

As will be readily understood, the disk-shaped portable data storage device having universal contacts greatly facilitates the ease of use of such devices. The individual user is no longer concerned with having to properly orient the data storage device when used. Further, the unique disk-shape form factor, resembling a commonly accepted coin for example, allows for several such coins to be carried in a purse, handbook, or a person's pant's pocket. Because of the unique size and shape, the smart coins are also more comfortable to hold and much less susceptible to damage than the prior art smart cards.

Of course, the disk-shaped storage device need not be restricted to a round coin-shape, but can take any general disk-shape which allows for the use of universal contacts when inserted into a reading device.

Further, the physical interface of the C-shape latching mechanism can also be varied within the spirit and scope of the present invention. It is advantageous, however, to provide the user with some type of feedback, tactile or otherwise, during the insertion and removal of the portable data storage device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A communication system, comprising:
    a disk-shaped device having a first and a second planar surface and having at least one universal contact symmetrically arranged about a center of each of said first and second planar surfaces of the disk-shaped device;
    at least one electrical component arranged in the disk-shaped device coupled in the same manner with each said at least one universal contact; and
    an interface device which receives the disk-shaped device and has at least one defined interface contact, said interface contact operatively coupling with the at least one universal contact regardless of the orientation of the disk-shaped device in the interface device, said interface device including a microprocessor in signal communication with the electrical component when the disk-shaped device is in the interface device, a memory coupled to the microprocessor, a display coupled to the microprocessor and a tuner and antenna system coupled to the microprocessor;
    wherein the electrical component of the disc-shaped device is a data storage device containing tuning data, said microprocessor operating the tuner and antenna system in accordance with the tuning data to obtain radio frequency information.

2. The system according to claim 1, wherein the interface device is a reading device, and wherein the electrical component in the disk-shaped device is a memory, which memory is in signal communication with the reading device via the at least one universal contact when the disk-shaped device is in the interface device.

3. The system according to claim 1, wherein the interface device further comprises:
    a power source coupled with the microprocessor, said power source having power and ground contacts which electrically couple with the electrical component in the disk-shaped device via first and second universal contacts when the disk-shaped device is in the interface device.

4. The system according to claim 3, wherein after insertion of the disk-shaped device in the interface device, the microprocessor queries the electrical component to configure the at least one interface contact to properly provide the power and ground couplings to the disk-shaped device.

5. A system for locating a disk-shaped portable communications device having at least one universal contact on each side in a defined location, comprising:
    an interface device; and
    a latching mechanism arranged in the interface device for seating the disk-shaped device at the defined location, wherein each of said at least one universal contact is arranged in the same manner on each side of the disk-shaped device and comes to rest at a respective precise location within the interface device when the disk-shaped device is at the defined location;
    wherein the latching mechanism comprises a C-shaped clamp, said disk-shaped device being inserted into an open end of the C-shaped clamp wherein the C-shaped clamp is sized to correspond to the disk-shaped device and is elastically deformable to allow the disk-shaped device to be inserted therein.

6. The system according to claim 5, wherein the interface device comprises a housing and a display arranged thereon, said interface device communicating with the disk-shaped device via the at least one universal contact and displaying information on the display based on the disk-shaped device.

7. A system for locating a disk-shaped portable communications device having at least one universal contact on each side in a defined location, comprising:
    an interface device; and
    a latching mechanism arranged in the interface device for seating the disk-shaped device at the defined location, wherein each of said at least one universal contact is arranged in the same manner on each side of the disk-shaped device and comes to rest at a respective precise location within the interface device when the disk-shaped device is at the defined location; wherein the latching mechanism comprises:

at least one latching arm arranged in the interface device and being pivotable about one end, said latching arm having a convex surface facing an inserted disk-shaped device; and a spring arranged to bias the latching arm against an insertion force of the disk-shaped device.

8. The system according to claim 7, wherein the latching mechanism further comprises a second latching arm having a convex surface arranged to face the convex surface of the first latching arm.

9. The system according to claim 7, wherein the spring is one of a helical spring, a sprung steel spring and a polymer foam spring.

10. A system for locating a disk-shaped portable communications device having at least one universal contact on each side in a defined location, comprising:

an interface device; and a latching mechanism arranged in the interface device for seating the disk-shaped device at the defined location, wherein each of said at least one universal contact is arranged in the same manner on each side of the disk-shaped device and comes to rest at a respective precise location within the interface device when the disk-shaped device is at the defined location;

wherein the latching mechanism comprises:

at least one latching arm arranged in the interface device and being pivotable about one end, said latching arm having both a convex and concave surface facing an insertion direction of the disk-shaped device; and a spring arranged to bias the latching arm against an insertion force of the disk-shaped device;

whereby the convex surface provides a smooth tactile sensation when inserting the disk-shaped device and the concave surface provides a secure positional seating of the disk-shaped device within the interface device.

* * * * *